United States Patent [19]

Nikaido et al.

[11] 4,042,969
[45] Aug. 16, 1977

[54] ELECTRIC CABLE POWER TRANSMISSION LINES

[75] Inventors: Teruji Nikaido, Ichihara; Kaoru Haga, Tokyo; Yasutaka Fujiwara, Yokohama, all of Japan

[73] Assignees: Tokyo Electric Power Co. Ltd., Tokyo; Showa Electric Wire & Cable Co. Ltd., Kawasaki, both of Japan

[21] Appl. No.: 590,564

[22] Filed: June 26, 1975

[30] Foreign Application Priority Data

June 27, 1974 Japan .............................. 49-76379[U]

[51] Int. Cl.$^2$ ................................................ H02H 7/22
[52] U.S. Cl. .................................... 361/107; 361/118
[58] Field of Search ................... 317/44, 45, 61.5, 61; 307/147, 148; 174/32, 36

[56] References Cited

U.S. PATENT DOCUMENTS

| 514,167 | 2/1894 | Tesla | 307/148 |
|---|---|---|---|
| 1,512,443 | 10/1924 | Atkinson | 317/44 |
| 1,512,444 | 10/1924 | Atkinson | 317/44 |
| 1,603,875 | 10/1926 | Shanklin | 317/44 X |
| 2,018,241 | 10/1935 | Viele | 317/44 |
| 3,046,422 | 7/1962 | Albright | 307/147 |
| 3,795,820 | 3/1974 | Eidinger | 317/44 X |
| 3,857,071 | 12/1974 | Nikaido et al. | 317/44 |

Primary Examiner—J D Miller
Assistant Examiner—Patrick R. Salce
Attorney, Agent, or Firm—Fleit & Jacobson

[57] ABSTRACT

In an electric cable power transmission line of the class wherein three phase metal sheath single core power cable sections are interconnected by junction boxes, two sets of ordinary junction boxes at the opposite ends of each unit line section are grounded, two sets of junction boxes are provided in each unit line section, at each set of the insulating junction boxes the sheaths of the cables of one phase on one side of the insulating junction boxes are crossconnected by cross-connecting wires to the sheaths of the cables of another phase on the other side thereby forming three loop circuits each including the grounding connections of the ordinary junction boxes, the sheaths of the cable sections and the cross-connecting wires, saturable reactors are connected in series with only one or two of the loop circuits. This arrangement reduces the number of the saturable reactors and protective devices for corrosion preventing layers as well as the inductive interference to nearby communication lines.

9 Claims, 4 Drawing Figures

ELECTRIC CABLE POWER TRANSMISSION LINES

BACKGROUND OF THE INVENTION

This invention relates to improvements of an electric power transmission line constituted by electric cables and more particularly to an electric power transmission line constituted by electric cables wherein the sheaths of the cables of the adjacent sections are cross-connected.

In a cable power transmission line in which three single core power cables each provided with a metal sheath are laid in parallel, a cross-connection system is often adapted for the purpose of decreasing circulating current flowing through the metal sheaths.

According to the cross-connection system cables sections are connected such that two sets of ordinary junction boxes electrically interconnecting the sheaths of adjacent cable sections and two sets of insulating junction boxes insulatively interconnecting the sheaths of adjacent cable sections are used and that two sets of insulating junction boxes are included in each unit line section extending between two sets of ordinary junction boxes. The ordinary junction boxes are grounded, whereas at the insulating junction boxes, the sheaths of the cable sections belonging to different phases are cross-connected by connecting wires so as to cause the currents induced in the sheaths of the cable sections belonging to different phases to cancel with each other.

In such cross-connection system, the object thereof can not be attained unless the spacings between adjacent junction boxes in each unit line section are equal and the relative arrangement of the cables of respective phases between respective junction boxes is equal. In actual cable power transmission lines owing to the ground surface conditions or the like it is extremely difficult to satisfy these requirements with the result that considerably large circulating current flows through the cable sheaths even when the cross-connection system is adopted.

We have already developed an improved cross-connection system in which a saturable reactor manifesting remarkable saturating characteristic for large current such as fault current is connected in series with each of three cross-connecting wires at either one set of the insulating junction boxes. Although this improved system can greatly reduce the circulating current flowing through the cable sheaths even when the spacings between adjacent junction boxes are not equal or the relative arrangement of the cables of respective phases between adjacent junction boxes is not equal. However, since the normal impedance of the return circuit for the sheaths is high, a large proportion of the zero phase component of the phase current flows through the returns circuits thereby increasing the inductive interference to near-by communication lines.

As a result of our investigation made for the purpose of obviating the difficulties just described we have found that even when saturable reactors are inserted in only one or two cross-connection wires instead of inserting them in all of three cross-connection wires it is possible to greatly decrease the current circulating through the sheath of the cable of the phase in which the saturable reactor is not connected.

SUMMARY OF THE INVENTION

Accordingly, it is an object of this invention to provide an improved electric cable power transmission line of the type utilizing the cross-connecting system in which the number of the saturable reactors utilized in the cross-connecting system and the number of protective devices for corrosion preventing layers are decreased without materially decreasing the effect of suppressing the current flowing through the cable sheath thereby decreasing the cost of installation and maintenance.

Another object of this invention is to provide an improved electric cable power transmission line of the type described above which is capable of decreasing inductive interference for nearby communication lines.

According to this invention these and other objects can be accomplished by providing an electric cable power transmission line of the class wherein three phase metal sheath single core power cable sections are interconnected by junction boxes, two sets of ordinary junction boxes at the opposite ends of each unit line section are grounded, two sets of insulating junction boxes are provided in each unit line section, the sheath of the cable of one phase on one side of the insulating junction boxes is cross-connected by a cross-connecting wire to the sheath of the cable of another phase on the other side thereby forming three loop circuits each including the prounding connections of the ordinary junction boxes, the sheaths of the cable sections and the cross-connecting wires, and saturable reactors are connected in series with the cross-connecting wires, characterized in that the saturable reactor is connected in series with one or two of the loop circuits.

Between the terminals of the saturable reactors and the ground are connected protective devices for corrosion preventing layers, each comprising a non-linear resistance element and a discharge gap connected in series therewith.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
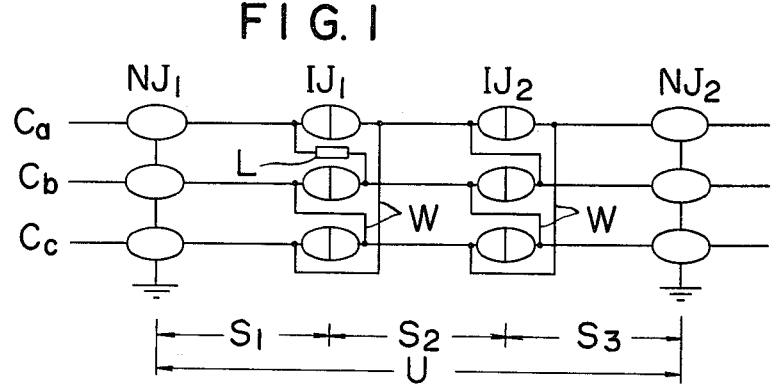
FIGS. 1 to 3 are diagrammatic representations of different embodiments of this invention and FIG. 4 is a connection diagram showing one example of a saturable reactor and a protective device of a corrosion preventing layer.
Figure 2:
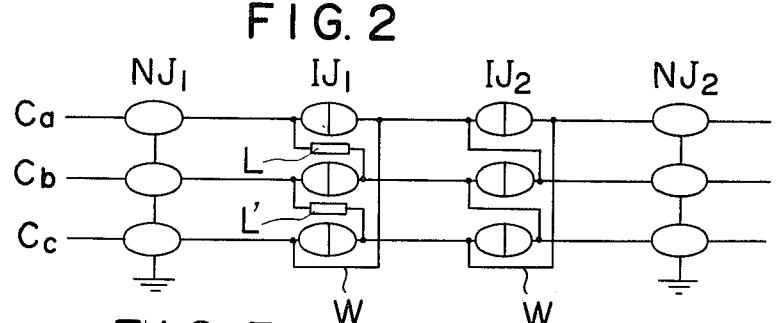
Figure 3:
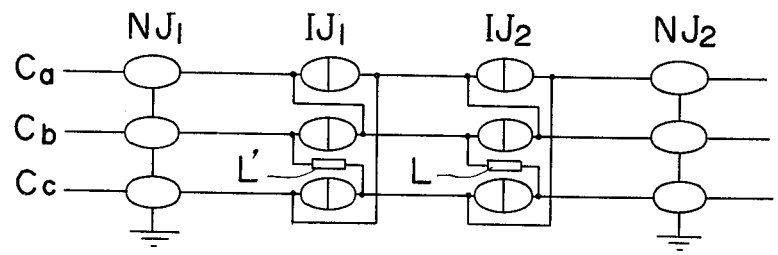

Referring now to FIGS. 1 to 3, sections of three sets of single core power cables Ca, Cb and Cc each provided with a metal sheath, now shown, are successively connected in series by means of a plurality of sets of ordinary junction boxes $NJ_1$, $NJ_2$ and insulating junction boxes $IJ_1$, $IJ_2$. As described hereinabove, two sets of insulating junction boxes $IJ_1$ and $IJ_2$ are provided in each unit line section U between two sets of ordinary junction boxes $NJ_1$ and $NJ_2$ which are grounded as shown.

Metal sheaths of the cable sections of different phases before and after respective insulating junction boxes $IJ_1$ and $IJ_2$ are cross-connected by cross-connecting wires W. In the embodiment shown in FIG. 1 a saturable reactor L is connected in series with only one cross-connecting wire associated with either one of the sets of the insulating junction boxes for example $IJ_1$.

Figure 4:
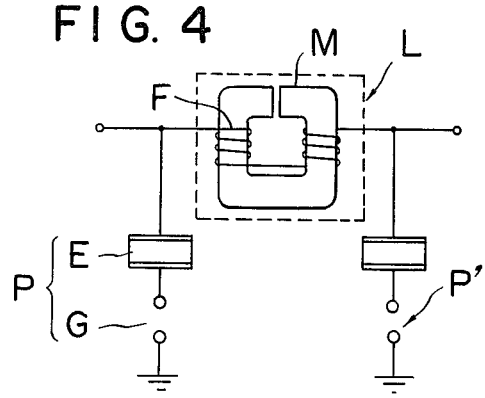

As illustrated in FIG. 4, the saturable reactor L comprises an annular magnetic core M having an air gap and a coil F comprising a tape shaped conductor wound about the core a predetermined number of turns and moulded in an insulating material, rubber for example so that the core L of the saturable reactor saturates completely when large current such as fault current flows through the coil.

Although the reactance value of the saturable reactor is not limited it is advantageous that it has an impedance $(dV/dI)$ of about 1 ohm before saturation and an impedance of less than about 0.01 ohm after saturation. Protective devices P and P' each comprising a non-linear resistance element E and a discharge gap G are connected between the input and output terminals of the saturable reactor L and the ground for protective corrosion preventing layers. Normally, these protective devices manifest high resistance, but when a voltage surge exceeding a predetermined level reaches the saturable reactor, the gap G at the incoming terminal discharges to prevent sheath voltage at the point to which the saturable reactor is connected from rising to an abnormal value.

In the embodiment shown in FIG. 2, saturable reactors L and L' and the protective devices for the corrosion preventing layer, not shown, are connected in series with two cross-connecting wires among three wires at one set of insulating junction boxes $IJ_1$.

In the embodiment shown in FIG. 3, the combination of the saturable reactor L and the protective device for the corrosion preventing layers, not shown, is transferred to the other set of the insulating junction boxes $IJ_2$. The embodiment shown in FIG. 3 is electrically equivalent to that shown in FIG. 2.

As above described in accordance with this invention, saturable reactors are connected in series with only one or two of three loop circuits formed by the grounding connections for ordinary junction boxes between three phase cables and the cross-connections of the sheaths of the cables at the insulating junction boxes. Accordingly, in a unit section of the cable power transmission line there are two or one such loop circuits that do not include any saturable reactor thus reducing the cost of installation.

Table 1 below shows how the current flowing through the loop circuits including the cable sheaths varies when the saturable reactors are included in the loop circuits in a 275 KV, 1200 mm², aluminum coated single core oil filled cable power transmission line. In this table phase A means a loop circuit extending through the sheath of cable Ca in section $S_1$ between junction boxes $NJ_1$ and $IJ_1$, through the sheath of cable Cb in section $S_2$ between junction boxes $IJ_1$ and $IJ_2$, through the sheath of cable Cc in section $S_3$ between junction boxes $IJ_2$ and $NJ_2$, and from junction box $NJ_2$ back to junction box $NJ_1$ through the ground, in the case of FIG. 1. Phases B and C have similar meanings.

Table 1

| Variation in the Sheath Current Caused by the Insertion Saturable Reactors | | | | |
|---|---|---|---|---|
| Number of saturable reactors inserted | 0 | 1 | 2 | 3 |
| Phase in which the saturable reactor is inserted | — | phase A | phases A and B | all phases |
| Phase A | 40 | 4 | 4 | 4 |

Table 1-continued

| Variation in the Sheath Current Caused by the Insertion Saturable Reactors | | | | |
|---|---|---|---|---|
| Sheath current (ampere) Phase B | 27 | 15 | 2 | 2 |
| Phase C | 18 | 15 | 5 | 2 |

As can be noted from this table, when no saturable reactor was inserted, the sheath current of phase A was 40 amperes but when a saturable reactor was inserted in phase A alone corresponding to FIG. 1 embodiment; the sheath current was decreased to only 4 amperes. Concurrently therewith, the sheath currents of phases B and C in which no saturable reactor was inserted have decreased to 15 amperes from 27 and 18 amperes respectively.

Where saturable reactors were inserted in phases A and B (corresponding to the embodiments shown in FIGS. 2 and 3) the sheath currents in phases A, B and C have decreased to 4, 2 and 5 amperes respectively, thus providing substantially the same sheath current suppressing effect as the case in which saturable reactors are inserted in all phases.

In this manner, the same advantageous effect afforded by inserting saturable reactors in all of three loops can also be provided by inserting the saturable reactor in only one or two of the three loops, which means that it is possible not only to reduce the number of saturable reactors and the protective devices for corrosion preventing layers but also to reduce the space and cost of installation and maintenance of these elements. More important is the fact that the impedance of the return circuit to the sheaths is decreased less than a case in which the saturable reactors are included in all of three phases thereby decreasing the inductive interference to nearby communication lines.

Table 2 below shows the result of theoretical calculation for a model cable circuit which was made for the purpose of knowing how the percentage of the zero phase component of the phase current that flows into the ground varies as the number of the saturable reactors inserted is varied. This table clearly shows that when the saturable reactor was inserted in only one phase the percentage of the zero phase component that flows into the ground was reduced to less than one half of the case where the saturable reactors were inserted in all phases. When saturable reactors were inserted in two phases, the percentage was reduced to less than 60%.

Table 2

| Variation in the Current Flowing into the Ground Caused by the Insertion of Saturable Reactor | |
|---|---|
| No. of saturable reactors inserted | Percentage of the zero phase component of the phase current flowing into the ground |
| 0 | 12.9 |
| 1 | 14.6 |
| 2 | 18.5 |
| 3 | 31.1 |

In this manner, according to this invention since the percentage of the zero phase component of the phase current that flows into the ground is reduced greatly, it is possible to greatly reduce the inductive interference to nearby communication lines.

Although in the above described embodiments, two sets of ordinary junction boxes and two sets of insulating junction boxes were installed in a unit line section provided with a cross-connecting system another set of ordinary junction boxes (but not grounded) may be added. It is also to be understood that the construction and combination of the protective device for the corrosion preventing layer are not limited to those illustrated in FIG. 2.

What is claimed is:

1. An electric cable power transmission line of the class wherein three phase metal sheath single core power cable sections are interconnected by junction boxes comprising, three single core power cables having metal sheaths, two sets of ordinary junction boxes each at opposite ends of a cable section, means for grounding each set of ordinary junction boxes, two sets of insulating junction boxes in each cable section between each set of ordinary junction boxes, cross-connecting wire means for connecting the metal sheaths of one power cable on one side of the insulating junction boxes to the metal sheaths of another power cable on the other side of the insulating junction boxes, thereby forming three loop circuits, each loop circuit including the grounding connections of the ordinary junction boxes, the metal sheaths of the cable sections, and the cross-connecting wire means, and no more than two saturable reactors, each connected in series with no more than two cross-connecting wire means thus providing no more than two loop circuits with saturable reactors.

2. The electric cable power transmission line according to claim 1 comprising one said saturable reactor included in only one cross-connecting wire means of one set of said insulating junction boxes.

3. The electric cable power transmission system according to claim 1 wherein two saturable reactors are included in two cross-connecting wire means, respectively, of one set of said insulating boxes.

4. The electric cable power transmission system according to claim 1 wherein a single saturable reactor is included in a single cross-connecting wire means of each set of said insulating junction boxes.

5. The electric cable power transmission system according to claim 1 wherein a protective device for corrosion preventing layer is connected between each said saturable reactor and the ground.

6. The electric cable power transmission line according to claim 5 wherein said protective device comprises a non-linear resistance element and a discharge gap connected in series therewith.

7. The electric cable power transmission line of claim 1 wherein each set of ordinary junction boxes comprises three ordinary junction boxes, each ordinary junction box connected to each single core power cable.

8. The electric cable power transmission line of claim 1 wherein each set of insulating junction boxes comprises three insulating junction boxes, each insulating junction box connected to each single core power cable.

9. The electric cable power transmission line of claim 1 wherein said cross-connecting wire means comprises electrical conducting wires.

* * * * *